US009226310B2

(12) United States Patent
Turtinen et al.

(10) Patent No.: US 9,226,310 B2
(45) Date of Patent: *Dec. 29, 2015

(54) FEEDBACK RESOURCE MAPPING IN WIRELESS COMMUNICATIONS

(71) Applicant: Broadcom Corporation, Irvine, CA (US)

(72) Inventors: Samuli Turtinen, Li (FI); Sami-Jukka Hakola, Kempele (FI); Timo K. Koskela, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 13/678,890

(22) Filed: Nov. 16, 2012

(65) Prior Publication Data

US 2013/0128830 A1  May 23, 2013

(30) Foreign Application Priority Data

Nov. 17, 2011  (GB) .................................. 1119864.5

(51) Int. Cl.
*H04W 4/00* (2009.01)
*H04W 72/12* (2009.01)
*H04L 1/18* (2006.01)
*H04L 27/00* (2006.01)
*H04W 72/04* (2009.01)
*H04L 5/00* (2006.01)

(52) U.S. Cl.
CPC ............. *H04W 72/12* (2013.01); *H04L 1/1861* (2013.01); *H04L 5/0037* (2013.01); *H04L 5/0053* (2013.01); *H04L 27/0006* (2013.01); *H04L 5/0007* (2013.01); *H04W 72/0446* (2013.01)

(58) Field of Classification Search
USPC ..................... 370/330, 329; 455/434, 422.1
See application file for complete search history.

(56) References Cited

U.S. PATENT DOCUMENTS

| 2004/0157613 | A1 | 8/2004 | Steer et al. |
| 2005/0239441 | A1 | 10/2005 | Eronen |
| 2005/0245199 | A1 | 11/2005 | Batra et al. |
| 2006/0223448 | A1 | 10/2006 | Kruys |
| 2007/0207828 | A1 | 9/2007 | Cheng et al. |
| 2007/0213046 | A1 | 9/2007 | Li et al. |
| 2008/0084844 | A1 | 4/2008 | Reznik et al. |
| 2008/0291049 | A1 | 11/2008 | Meek |
| 2009/0209264 | A1 | 8/2009 | Yang et al. |
| 2010/0041410 | A1 | 2/2010 | Englund et al. |
| 2010/0085921 | A1 | 4/2010 | Wu et al. |
| 2010/0136932 | A1 | 6/2010 | Osterling et al. |

(Continued)

*Primary Examiner* — Kwang B Yao
*Assistant Examiner* — Adam Duda
(74) *Attorney, Agent, or Firm* — Oblon, McClelland, Maier & Neustadt, L.L.P.

(57) ABSTRACT

In an ad hoc network a feedback radio resource maps from a data radio resource to at least one frequency sub-band which the data resource excludes. The feedback resource is also spaced in time from the data resource by a predetermined interval. Feedback (ACK/NACK) for data received in the data resource is then sent in the feedback resource. In various embodiments the sub-band is one or more edges of the data resource channel, or edges of a component carrier. The predetermined interval may be a function of how much of the data resource is occupied by data. The data transmitting device delays sending its data by a time offset from the end of a previous transmission on that channel, or if it does not know the end time it delays until the predetermined interval plus the length of the feedback resource have lapsed. Various synchronization aspects are also disclosed.

23 Claims, 4 Drawing Sheets

(56) References Cited

U.S. PATENT DOCUMENTS

| | | |
|---|---|---|
| 2010/0207784 A1 | 8/2010 | Bragg et al. |
| 2011/0019541 A1 | 1/2011 | Li et al. |
| 2011/0134831 A1 | 6/2011 | Pirskanen |
| 2011/0195667 A1 | 8/2011 | Hassan et al. |
| 2011/0228666 A1 | 9/2011 | Barbieri et al. |
| 2012/0077510 A1 | 3/2012 | Chen et al. |
| 2012/0165059 A1 | 6/2012 | Schmidt et al. |
| 2012/0250631 A1 | 10/2012 | Hakola et al. |
| 2012/0281593 A1 | 11/2012 | Stewart et al. |
| 2012/0307748 A1 | 12/2012 | Cheng et al. |
| 2014/0036803 A1 | 2/2014 | Park |

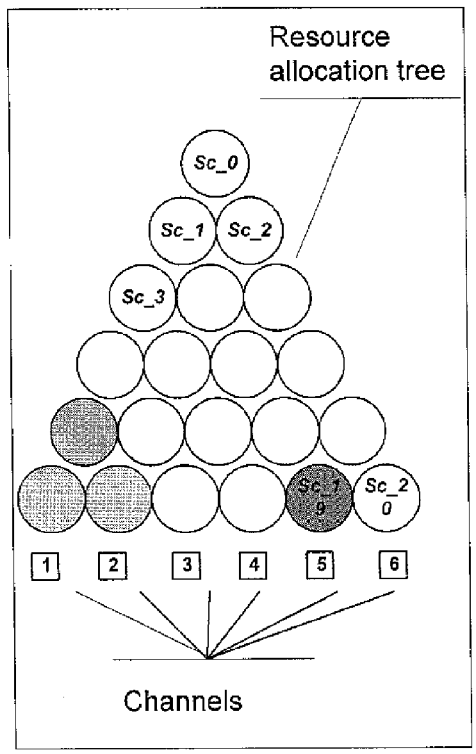
Figure 1: Prior Art
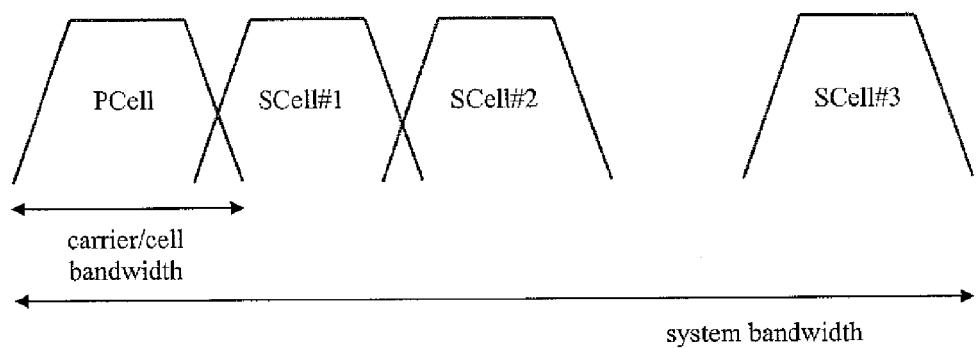
Figure 2

402: map a feedback radio resource from a data radio resource to at least one frequency sub-band which the data radio resource excludes, and spaced in time from the data radio resource by a predetermined interval

↓

404: send or receive feedback for information received or sent on the data radio resource on the mapped feedback radio resource 406: frequency sub-band = frequency edges of a radio channel bearing the data radio resource 408: frequency sub-band = frequency edges of a component carrier bandwidth in which lies a radio channel bearing the data radio resource 410: for receiver of the feedback:
delay sending the information on the data radio resource until a predetermined time offset (integer multiple of a symbol time) following an end of a previous transmission on a radio channel bearing the data radio resource 412: for receiver of the feedback, if end time for a previous transmission on the radio channel is unknown:
delay sending the information on the data radio resource until a predetermined time lapse (the predetermined interval plus a fixed time length of the feedback radio resource)

414: receive a synch signal on a common channel and synchronize the data radio resource only if a synch timer has not expired

Figure 4

FEEDBACK RESOURCE MAPPING IN WIRELESS COMMUNICATIONS

CROSS REFERENCE TO RELATED APPLICATION

This application claims benefit under 35 U.S.C. §119(a) and 37 CFR 1.55 to UK Patent Application 1119864.5 (filed on Nov. 17, 2011).

TECHNICAL FIELD

The exemplary and non-limiting embodiments of this invention relate generally to wireless communication systems, methods, devices and computer programs and, more specifically, relate to radio resources for feedback signaling such as for acknowledgements and negative acknowledgements.

BACKGROUND

The following abbreviations that may be found in the specification and/or the drawing figures are defined as follows:
  3GPP third generation partnership project
  ACK acknowledgement
  eNB evolved NodeB (BS of a LTE/LTE-A system)
  FDD frequency division duplexing
  HARQ hybrid automatic repeat request
  LTE long term evolution (evolved UTRAN)
  LTE-A long term evolution advanced
  NACK negative acknowledgement
  PSS primary synchronization signal
  RAT radio access technology
  RF radiofrequency
  SSS secondary synchronization signal
  TDD time division duplexing
  TX transmission
  UE user equipment
  UTRAN universal terrestrial radio access network
  WLAN wireless local area network (sometime termed WiFi)

Wireless radio operations in licensed frequency bands has been utilized to such an increasing extent that portions of the radio spectrum that still remain available have become limited. Various network operators, service providers, communication device manufacturers, and communication system manufacturers are therefore seeking efficient solutions to utilize unlicensed frequency bands, also termed shared band or bands and more formally as license-exempt bands. Communication on an unlicensed shared band is generally based on sharing an available channel between different communication devices that are not all under control of a single network operator, since no network operator has exclusive control over this radio spectrum. The different communication devices may utilize a common RAT, but in certain scenarios the different communication devices may utilize different RATS.

In an unlicensed shared band the channel access can be distributed, in which the communication devices detect a channel and utilize a channel reservation scheme known to other communication devices in order to reserve a right to access the channel. In distributed channel access, a transmitting communication device and a receiving communication device are generally not synchronized to a global reference. Transmissions on an unlicensed shared band that do not utilize a common timing reference (one shared by both the transmitting communication device and the receiving communication device) are generally short in duration in order to allow multiple communication devices to share the channel. Generally, in this scenario a transmitting communication device only transmits a few packets at a time before the transmitting communication device defers its access to some other transmitting communication device that also occupies the channel. After a random duration, the first transmitting communication device then transmits again. Therefore specific measures are required in order to initially synchronize the transmitting communication device and receiving communication device at the beginning of each data transmission. This is sometimes done by synchronizing the receiving communication device with the data transmission (that is, informing the receiving communication device when the first packet of the data transmission begins).

In addition to synchronization, the transmitting communication device can indicate frequency resources that can be utilized for transmission. In general a transmitting communication device may only utilize a portion of the frequency resources, and can indicate to the receiving communication device which portion of the frequency resources the transmitting communication device will utilize for transmission. In one prior art technique for communicating in the license-exempt band, a transmitter sends at least two synchronization sequences having cyclic shift characteristics prior to the data transmission. The intent is that the first sequence is used to synchronize the receiver and the cyclic shift in the subsequent sequence(s) is/are used to inform the receiver about the radio resources being used for the data transmission. The resource mapping between the cyclic shift that the receiver observes and actual radio resources used by the transmitter can be implemented using a tree-based method such as that shown at FIG. 1. The unlicensed bandwidth is divided into predetermined channels and the transmitted cyclic shift maps to a specific radio resource or resources on a specific channel. Those teachings are not seen to provide an efficient manner for organizing feedback from the receiver to the transmitter, such as ACK and NACK messages.

The WLAN family of standards (IEEE 802.x) transmit MAC level feedback on the same resource as the actual data transmission after a short interframe space SIFS period (10 us). This is not seen to be efficient for broader implementation since the feedback thereby requires the whole bandwidth used by the WLAN for transmitting the original data. The LTE system conveys its uplink hybrid automatic repeat request HARQ ACK/NACK feedback for a dynamically scheduled downlink data transmission on a physical uplink control channel PUCCH channel which is derived from the physical downlink shared channel PDSCH on which the data was sent. Or alternatively if there is an uplink resource allocated for the time the feedback is to be sent the LTE system multiplexes the feedback with that uplink data sent on the allocated physical uplink shared channel PUSCH.

While there are many proposals for exactly how communications in the unlicensed band should be managed among the various devices seeking access, operation in the unlicensed shared band generally involves sharing one or more channels in a communication system between one or more communication devices, where the communication devices can utilize different RATs. What is needed is a way to provide effective asynchronous/contention-based access over a shared band with dynamic and scalable spectrum allocation. This is not only for expanding the available spectrum over which user devices may communicate but also to support ad hoc networked wireless mobile robotics which currently operate primarily using IEEE standards such as 802.11 and 802.15.4. These teachings provide a feedback mechanism which may be advantageously used for example in the unlicensed band, and which is scalable and dynamic with minimal added control signaling.

SUMMARY

The foregoing and other problems are overcome, and other advantages are realized, by the use of the exemplary embodiments of this invention.

In a first exemplary embodiment of the invention there is an apparatus for operating in an ad hoc wireless network. In this exemplary embodiment the apparatus comprises at least one processor and at least one memory storing a computer program. In this embodiment the at least one memory with the computer program is configured with the at least one processor to cause the apparatus to at least: map a feedback radio resource from a data radio resource to at least one frequency sub-band which the data radio resource excludes and spaced in time from the data radio resource by a predetermined interval; and send or receive feedback for information received or sent on the data radio resource on the mapped feedback radio resource.

In a second exemplary embodiment of the invention there is a method for operating in an ad hoc wireless network. In this exemplary embodiment the method comprises: mapping a feedback radio resource from a data radio resource to at least one frequency sub-band which the data radio resource excludes and spaced in time from the data radio resource by a predetermined interval; and sending or receiving feedback for information received or sent on the data radio resource on the mapped feedback radio resource.

In a third exemplary embodiment of the invention there is a computer readable memory tangibly storing a computer program executable by at least one processor, the computer program comprising: code for mapping a feedback radio resource from a data radio resource to at least one frequency sub-band which the data radio resource excludes and spaced in time from the data radio resource by a predetermined interval; and code for sending or receiving feedback for information received or sent on the data radio resource on the mapped feedback radio resource.

Further non-limiting embodiments for any of the above exemplary embodiments have the data radio resource and the feedback radio resource lying in either license exempt or public safety radio spectrum. For the case of public safety radio spectrum the ad hoc wireless network may for example be a public safety radio network operating in an ad hoc mode.

BRIEF DESCRIPTION OF THE DRAWINGS

FIG. 1 is a prior art diagram of a tree-based mapping between radio resources and cyclic shifts for synchronizing a transmitter with a receiver for communication in the unlicensed band.

FIG. 2 is a schematic diagram illustrating component carriers in a wireless radio access technology which utilizes carrier aggregation.

FIG. 4 is a logic flow diagram that illustrates from the perspective of the communicating devices the operation of a method, and a result of execution of computer program instructions embodied on a computer readable memory, in accordance with an exemplary embodiment of these teachings.

DETAILED DESCRIPTION

Figure 3:
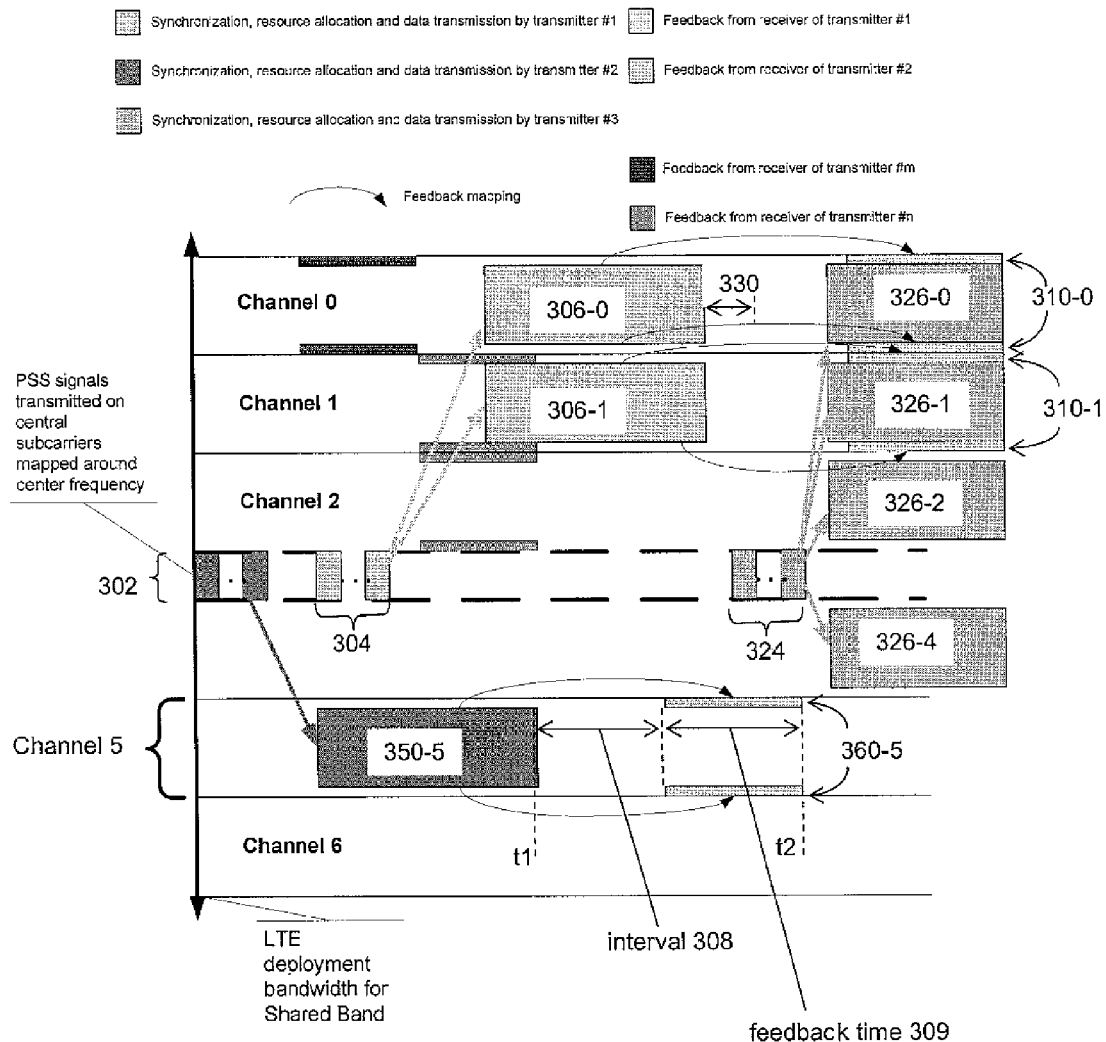
FIG. 3 is a time versus frequency diagram of channels and signaling according to an exemplary embodiment of these teachings.

Embodiments of these teachings are advantageously practiced in the license-exempt band, which in the United States includes television whitespaces which the Federal Communication Commission is considering opening for user communications, and which also include the industrial, scientific and medical (ISM) band which has traditionally been available for such communications at low power. In current understanding there is to be a database of available whitespace channels which certain nodes, whether network access points or the portable devices themselves, can access and update. These channels are identified by an index number and there may be wireless signaling to inform some portable devices of the available channels in case those portable devices lack the ability to access the database themselves.

There is also public safety radio spectrum that is reserved for use by public safety and other emergency/first responder personnel. In the US there are several bands designated for public safety radio: low-, medium- and high-band VHF, low-band UHF, 800 MHz (806-824 and 851-869 MHz), and 4.9 GHz (4940-4990 MHz). In Europe and elsewhere the public radios are sometimes referred to as TETRA (terrestrial trunked radio) and the majority of the TETRA frequencies are low-band UHF. While some public safety spectrum is utilized in an ad hoc manner similar to the license-exempt whitespaces, regulatory bodies often impose a licensing requirement to ensure this spectrum is reserved for use by only legitimate first responder and emergency organizations and their personnel even though there is no central controller of the spectrum that holds an exclusive license. Other public safety radio may be operated in a hierarchical structure with a centralized network operator tightly controlling use of the spectrum, similar in principle to traditional cellular-subscriber arrangements. Different regions and jurisdictions can deploy their respective public radio band differently, and at least the TETRA system can be operated in a direct mode (DMO, which utilizes a centralized control of the radio resources) and an ad hoc mode. These teachings are quite useful in the public safety radio bands and particularly ad hoc networks, and of course can also be utilized in the more traditional licensed bands. The specific examples below consider the license-exempt band as a non-limiting embodiment to better explain the principles herein.

The LTE system deploys its total bandwidth as multiple component carriers, of which FIG. 2 is an example. Each user in the licensed band is assigned a primary component carrier (PCell) and may be assigned also one or more secondary component carriers (SCell). There are various ways to deploy these component carriers: one or more may be backwards compatible with LTE Release 8 while others may not be due to a lack of some or all control channels or a bandwidth not fitted to the 20 MHz structure of Release 8; different component carriers may have different bandwidths; some or all may not be frequency-adjacent to the others; and one or more may lie in license-exempt bands. SCell#3 illustrates such a license-exempt component carrier. Carrier aggregation is not limited only to LTE.

According to an exemplary embodiment of these teachings there is both signaling of data on a first radio resource and feedback relevant for that data on a second radio resource. For convenience and without loss of generality, the first radio resource is termed herein as a data radio resource and the second radio resource is termed herein as a feedback radio resource. The examples below present two devices in communication with one another though more than two devices may be engaging in a common (clustered) communication. The device transmitting the data and receiving the feedback is termed the first device and the device receiving the data and transmitting the feedback is termed the second device. These examples also mention a third device which is not part of the communications ongoing between the first and second device but which is also using the license-exempt band, and so the examples describe how the first and second devices avoid interfering with that third device (and vice versa).

FIG. 3 is a time (horizontal) and frequency (vertical) diagram of certain channels and radio resources which illustrate one particular embodiment for implementing the invention described herein. In one non-limiting embodiment the data resource is found as follows. There is a common channel 302 (which may or may not lie in the license-exempt band) of which the various communicating devices are aware. A primary synchronization signal PSS 304 is transmitted on that common channel 302, such as on centrally-disposed orthogonal frequency division multiple access OFDMA subcarriers mapped about a center frequency of that common channel. The first device transmits the PSS 304 with a cyclic shift which maps to the data radio resource (or multiple cyclic shifts which map to it). FIG. 3 illustrates two PSSs 304 each with a cyclic shift that maps to a different data radio resource 306-0, 306-1 each on a different channel 0 and 1. Other embodiments of these teachings may signal the data radio resource to the second device in other manners such as explicitly on the common channel at times which avoid the PSS which may be sent at pre-determined intervals.

The second device is routinely monitoring the common channel 302 and so from reading the PSS 304 it knows where to find the data sent to it by the first device. Both the first and second devices map from the data radio resource to the feedback radio resource as follows, the first device in order to know where to find the feedback it expects to receive and the second device to know where to send that feedback. The feedback radio resource is spaced in time a pre-determined time interval 308 (which FIG. 3 shows in channel 5 but for this example is used on channels 0 and 1 for the mapping) from the data radio resource 306-0 on channel 0 to the feedback resource 310-0 on channel 0 (and similarly on channel 1 for resources 306-1 and 310-1). And the feedback radio resource 310-0, 310-1 is in at least one frequency sub-band which the radio resource 306-0, 306-1 from which it maps excludes. At FIG. 3 such excluded sub-bands (for example, OFDMA subcarriers) are at both edges of the channel in which lie the data radio resource 306-0, 306-1. Note particularly that the data radio resources 306-0 and 306-1 do not occupy the entire frequency bounds of their respective channel.

In another embodiment the feedback radio resources lie at both frequency edges of the license-exempt component carrier rather than edges of the individual channel as FIG. 3 illustrates. In this embodiment, assuming the whole license-exempt component carrier were divided into only the seven channels illustrated at FIG. 3 (numbered channels 0, 1, . . . 6), then the feedback resources would lie along the upper edge of channel 0 (as shown for the feedback radio resource 310-0) and/or along the lowermost edge of channel 6. In contrast to the implicit mapping used in the LTE system, in this embodiment the feedback resources are derived from the cyclic shift used for resource allocation with the certain time delay after the end of the data transmission in the data radio resource. In any of these embodiments the feedback resource may be at one but not both edges though FIG. 3 illustrates it lying at both edges of the respective channel.

Returning to the example illustrated at FIG. 3, the feedback radio resources 310-0, 310-1 thereby lie at the outer edge of each channel used in an aggregated resource allocation by the transmitter, after the predetermined interval 308. In an embodiment that predetermined interval is based on a certain processing delay needed by the second device to receive and decode the data in the data radio resource. During this interval 308 a third device can use the same channel for transmitting data, shown at resources 326-0, 326-1, 326-2 and 326-4 which map from that third device's PSS and cyclic shift 324 on the common channel 302. This is unlike WLAN specifications which reserve the whole channel from the onset of the data resource to the end of the feedback resource for the data and feedback between the first and second devices. In the embodiment shown at FIG. 3 two of the data radio resources 326-0, 326-1 which the third devices utilizes for its data overlap in time with the feedback radio resources 310-0 utilized by the second device to send its ACK/NACK for the data at resources 306-0 (and 306-1) to the first device.

In a specific embodiment the processing delay, and therefore the interval 308, is a function of the how much of the data radio resource 306-0 is actually used for the first device's data. While the time period is not fixed it is predetermined based on the data volume in the data radio resource 308-0 (or said another way, based on the time from the start to the end of the data transmitted in the data radio resource). Defining the interval 308 in this way rather than as a fixed time period regardless of how much of the resource 306-0 was used allows a lower HARQ round trip delay for smaller bandwidth transmissions via this dynamic feedback delay setting.

In a preferred embodiment the third device will have listened on channels 0 and 1 which it later schedules by its own PSS 324, and hearing the data there the third device will consider where the mapped feedback resources 310-0, 310-1 will lie so the third device can synchronize its data transmissions at 326-0, 326-1, 326-1 and 326-4 on the symbol level. This helps preserve orthogonality between the data sent by the third device (at 326-0, 326-1) and the feedback sent by the second device (at 310-0, 310-1) on the same channel (channels 0 and 1 in FIG. 3). Additionally it helps propagate a common synchronization in the license-exempt band so that radio resources may be more efficiently used system-wide.

Now consider if the third device was not synchronized with the first and second devices. If we assume there is no guard band to keep the transmissions 326-0 and 310-0 separate in time (since such a guard band would be quite spectrum-inefficient for the license-exempt band), then there is the problem of a non-orthogonality condition among subcarriers of a channel used simultaneously for feedback 310-0 and data 326-0 transmissions, and vice versa. Embodiments of these teachings alleviate this problem in two ways, depending on whether the third device is aware or not of when the transmission from the first device has ended. If the third device is aware of the end time of the first device's data transmission (the data transmission in data resource 306-0 in channel 0 of FIG. 3), then there is defined a time offset 330 from the end of the data transmission 306-0 on a channel to the beginning of the new data transmission on the same channel by any device, and this offset 330 is an integer multiple of the symbol time used in the system. Even if not synchronized with one another, each device will know the symbol structure used in the system and so will know the symbol time, but if not synchronized the symbol edges from different devices will not align.

If instead the third device is not aware of the end time of the first device's transmission on a given channel, then the third device will delay its own transmission by a time amount larger than the fixed time defined between the end of the data transmission and the corresponding feedback transmission (the interval 308) plus the time length of the feedback radio resource 309 which is fixed since the feedback is only an ACK or a NACK or possibly also/or a channel quality indictor. This is shown at channel 5 of FIG. 3, the result being that no other device which is unaware of the end time t1 of that data resource 350-5 will transmit until time t2 when the feedback resource 360-5 has passed.

In the above two examples for imposing a delay it was described that the various devices will delay their data transmissions. While true, in the specific FIG. 3 embodiment for scheduling the data radio resource this delay is implemented by delaying the start of the device's data radio resource which follows from the cyclic shift they send in their PSS on the common channel 302.

Above it was mentioned that it is advantageous if the same synchronization was propagated through the system so all devices on the unlicensed band would have the same timing. To that end embodiments of these teachings define a distributed synchronization propagation in which each device follows the synchronization of the last detected PSS signals of any other device on the common channel, provided that the time elapsed from the detection of that last PSS is not larger than a certain synchronization expiration timer running in the device. The effect of this embodiment is that when transmitting PSS signals according to timing detected from previous PSS signals, the transmitting device propagates the synchronization further for other devices listening on the common channel 302. The new transmission of PSS signals shall happen in integer multiples of symbol time of the system after an earlier detected PSS signal transmission. If instead the transmitting device has not detected any PSS signals within that certain time period (the timer expiration period) then it can send its own PSS signal at any time since there is no other timing in the system which is currently valid.

As an alternative to the above FIG. 3 embodiment in which there was one component carrier for the unlicensed band which was divided into multiple channels (seven channels in the FIG. 3 example), in another embodiment there is a separate component carrier allocated for each unlicensed band data channel. This alleviates the strong requirement in the embodiment immediately above that all transmissions be synchronized at the symbol level, since this embodiment allows unsynchronized transmissions on each separate channel and so only the feedback and the data transmissions by different devices need to be in synchronization at the symbol level. In this per-channel component carrier embodiment, there may be one channel in the license-exempt band fully allocated for PSS signal transmissions, and this common channel 302 may itself be unsynchronized. This approach further enables random access types of communication on the license exempt or public safety bands for channel access contention, conceptually similar to the random access concept in LTE and the contention window procedures in WLAN.

One technical effect of certain embodiments of these teachings is that they enable a combined synchronization, resource allocation and feedback channelization method which does not require an explicit control channel and/or control signaling for indicating the resources for data transmission and feedback. Another advantage is that the transmitter of the data can scale the resource utilization based on the need and availability, and perform synchronization at the same time. These teachings enable ad hoc networking, which is an evolving path for the LTE and LTE-A systems as well as other RATs and which is used in some deployments of public safety spectrum, and could be utilized for clustered device-to-device communications.

Now are detailed with reference to FIG. 4 further particular exemplary embodiments from the perspective of the portable communicating device. FIG. 3 may be performed by the whole first or second device 20, 24 shown at FIG. 5, or by one or several components thereof such as a modem. At block 402 the device 20, 24 maps a feedback radio resource 310-0 from a data radio resource 306-0 to at least one frequency sub-band which the data radio resource excludes, and spaced in time from the data radio resource by a predetermined interval 308. At block 404 the second device sends, and/or the first device receives, feedback for information received (by the second device) or sent (by the first device) on the data radio resource on the mapped feedback radio resource.

In the above teachings the data and feedback radio resources of block 402 could be license exempt spectrum, public safety radio spectrum, or licensed band spectrum. Certain advantages are evident where the wireless network in which these teachings are deployed is an ad hoc network. For the case of public safety radio spectrum the ad hoc wireless network may for example be a public safety radio network operating in an ad hoc mode.

Further portions of FIG. 4 represent various of the specific but non-limiting embodiments detailed above. At block 406 the at least one frequency sub-band comprises frequency edges of a radio channel bearing the data radio resource. The alternative to this is at block 408, where the at least one frequency sub-band comprises frequency edges of a component carrier bandwidth in which lies a radio channel bearing the data radio resource. As noted above but not summarized at FIG. 4, the feedback can be an acknowledgement or a negative acknowledgement; and the predetermined interval 308 is a function of a size of the information within the data radio resource.

A further embodiment is shown at block 410 of FIG. 4 from the perspective of the first device 20, namely the first device 20 delays sending the information on the data radio resource until a predetermined time offset 330 following an end time of a previous transmission on the radio channel, in which the predetermined time offset comprises an integer multiple of a symbol time. The embodiment for which the first device does not know the end time for a previous transmission on the radio channel is summarized at block 412, in which the first device 20 delays sending the information on the data radio resource until a predetermined time lapse which comprises the predetermined interval 308 plus a fixed length 309 of the feedback radio resource.

Block 414 is from the perspective also of the first device 20 and summarizes synchronization in the system. There the first device 20 receives a synchronization signal (prior to 304 on channel 302 in FIG. 3) on a common channel 302 and synchronizes the data radio resource 310-0 to timing defined by the synchronization signal only if a synchronization timer in the first device 20 has not expired. And finally, not specifically shown at FIG. 4 but detailed above as following from the synchronization at block 414, the first device 20 re-transmits the synchronization signal 304 on the common channel 302 after an integer multiple of symbol time has elapsed following reception of the synchronization signal. In this case the same synchronization signal may be transmitted but with a different cyclic shift to map to the data radio resource according to one non-limiting embodiment.

FIG. 4 is a logic flow diagram which may be considered to illustrate the operation of a method, and a result of execution of a computer program stored in a computer readable memory, and a specific manner in which components of an electronic device are configured to cause that electronic device to operate. The various blocks shown in FIG. 4 may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Figure 5:
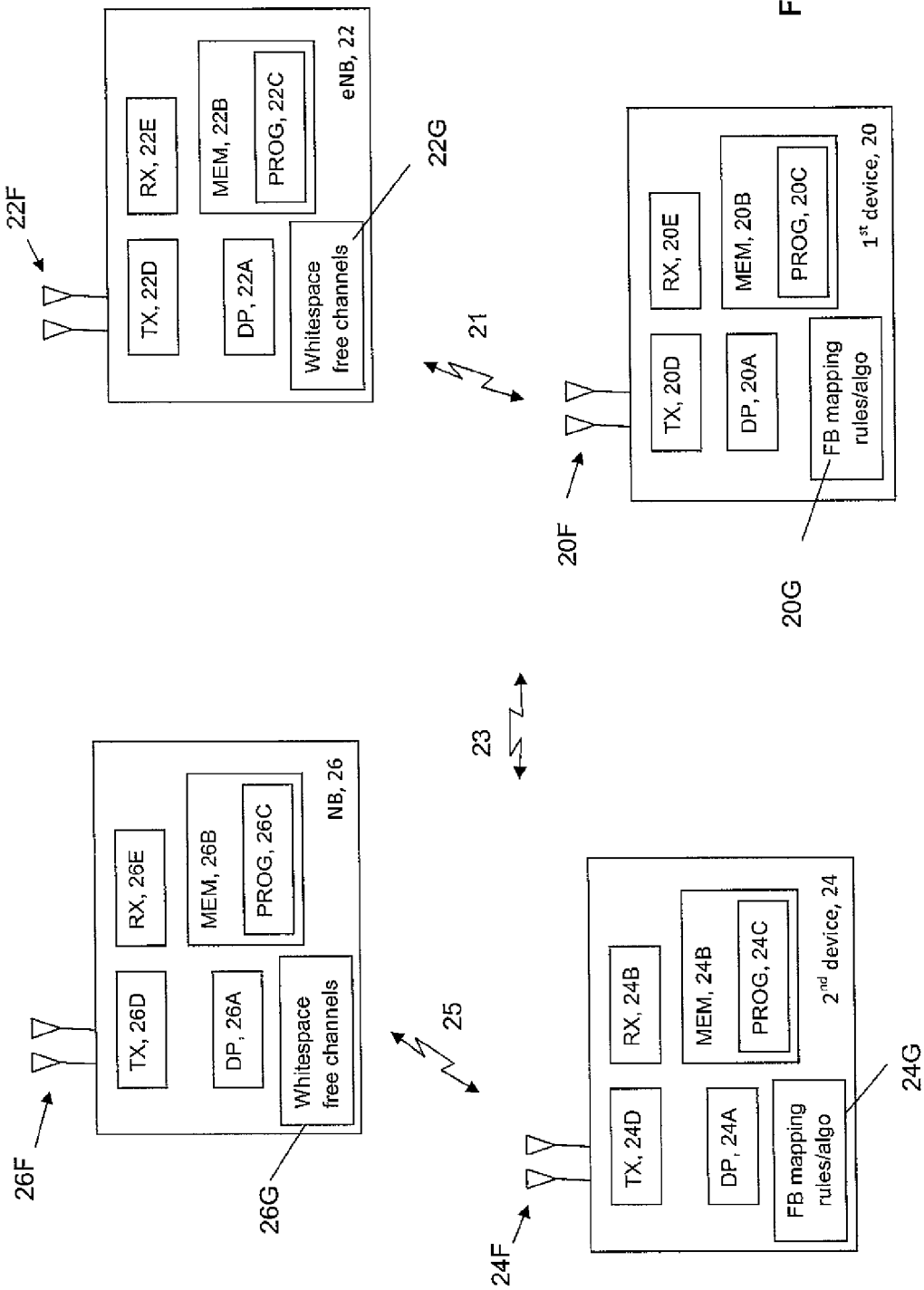
FIG. 5 is a simplified block diagram of two communicating devices/user equipments, each operating under a different radio access technology in their respective licensed bands and communicating directly with one another on a license-exempt band, which are exemplary electronic devices suitable for use in practicing the exemplary embodiments of this invention.

Reference is now made to FIG. 5 for illustrating a simplified block diagram of various electronic devices and apparatus that are suitable for use in practicing the exemplary embodiments of this invention. In FIG. 5 there is a first device 20 operating in the licensed band in the LTE system under an eNB 22 via wireless link 21, and there is also a second device 24 operating in another licensed band in the UTRAN system under a Node B 26 via wireless link 25. Not shown are higher network nodes for the LTE and UTRAN systems which provide connectivity with further networks such as for example a publicly switched telephone network PSTN and/or a data communications network/Internet. There may also be a data and/or control path (not shown) coupling the Node B 26 with the eNB 22.

The first device 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the eNB 22 and with the second device 26 via one or more antennas 20F. While only one transmitter and receiver are shown it is understood there may be more than one. Inherent in the first device is also a clock from which various software-defined timers are run, such as for example the synchronization timer mentioned above. Also stored in the MEM 20B at reference number 20G is the feedback mapping rules and implementing algorithm so the first device can map from a data radio resource to a feedback radio resource as detailed above for the various embodiments. The second device 24 is functionally similar with blocks 24A, 24B, 24C, 24D, 24E, 24F and 24G. The first and second devices 20, 24 communicate with one another directly according to the various described embodiments using the direct wireless link 23.

The eNB 22, or more generally the network serving cell, also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F. In some embodiments the first device learns of open channels in the license-exempt band from the eNB 22, which stores this information it gleaned from the whitespace database in its memory at 22G. In other embodiments 22G has the licensed-band frequencies or the public safety radio frequencies which may also be known to the first and second devices 20, 24 without explicit signaling with the network access nodes 22, 26. The Node B 26 is functionally similar with blocks 26A, 26B, 26C, 26D, 26E, 26F and 26G.

While not particularly illustrated for the devices 20, 24 or the network access nodes 22, 26, those apparatus are also assumed to include as part of their wireless communicating means a modem which may be inbuilt on an RF front end chip within those devices 20, 22, 24, 26 and which also carries the TX 20D/22D//24D/26D and the RX 20E/22E/24E/26E.

At least one of the PROGs 20C/24C in the first and second devices 20, 24 is assumed to include program instructions that, when executed by the associated DP 20A/24A, enable the device to operate in accordance with the exemplary embodiments of this invention, as was discussed above in detail. The network access nodes 22, 26 may also have software to implement certain aspects of these teachings such as providing information about available license-exempt bands as detailed above for certain non-limiting embodiments. In these regards the exemplary embodiments of this invention may be implemented at least in part by computer software stored on the MEM 20B, 22B, 24B, 26B which is executable by the DP 20A/24A of the communicating devices 20, 24 and/or by the DP 22A/26A of the network access nodes 22, 26; or by hardware, or by a combination of tangibly stored software and hardware (and tangibly stored firmware). Electronic devices implementing these aspects of the invention need not be the entire apparatus 20, 22, 24, 26 as shown, but exemplary embodiments may be implemented by one or more components of same such as the above described tangibly stored software, hardware, firmware and DP, or a system on a chip SOC or an application specific integrated circuit ASIC or a digital signal processor DSP.

In general, the various embodiments of the first and/or second device 20, 24 can include, but are not limited to: data cards, USB dongles, user equipments, cellular telephones; personal portable digital devices having wireless communication capabilities including but not limited to laptop/palmtop/tablet computers, digital cameras and music devices, Internet appliances, remotely operated robotic devices or machine-to-machine communication devices.

Various embodiments of the computer readable MEMs 20B/22B/24B/26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A/22A/24A/26A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the E-UTRAN (LTE/LTE-A) system, it should be appreciated that the exemplary embodiments of this invention are not limited for use with only this one particular type of wireless communication system, and that they may be used to advantage in other wireless communication systems such as for example GERAN, UTRAN and others which facilitate direct ad hoc communications by user or other portable radio devices over license-exempt, public safety, or licensed spectrum.

Some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. A method for operating a communication device in an ad hoc wireless network, the method comprising:
   using the communication device to map a feedback radio resource from a data radio resource to at least one frequency sub-band which the data radio resource excludes and spaced in time from the data radio resource by a predetermined interval; and
   using the communication device to send or receive feedback for information received or sent on the data radio resource on the mapped feedback radio resource.

2. The method according to claim 1, in which the at least one frequency sub-band comprises frequency edges of a radio channel bearing the data radio resource.

3. The method according to claim 1, in which the at least one frequency sub-band comprises frequency edges of a component carrier bandwidth in which lies a radio channel bearing the data radio resource.

4. The method according to claim 1, in which the feedback comprises an acknowledgement or a negative acknowledgement; and both the data radio resource and the feedback radio resource lie in one of license exempt or public safety radio spectrum.

5. The method according to claim 1, in which the predetermined interval is a function of a size of the information within the data radio resource.

6. The method according to claim 1, in which the method comprises receiving the feedback at the communication device after sending the information on the data radio resource;
   the method further comprising delaying sending from the communication device the information on the data radio resource until a predetermined time offset following an end time of a previous transmission on a radio channel bearing the data radio resource, in which the predetermined time offset comprises an integer multiple of a symbol time.

7. The method according to claim 1, in which the method comprises receiving the feedback at the communication device after sending the information on the data radio resource; the method further comprising delaying sending from the communication device the information on the data radio resource until a predetermined time lapse for the case an end time for a previous transmission on radio channel bearing the data radio resource is unknown, in which the predetermined time lapse comprises the predetermined interval plus a fixed length of the feedback radio resource.

8. The method according to claim 1, the method further comprising:
   receiving at the communication device a synchronization signal on a common channel and synchronizing the data radio resource to timing defined by the synchronization signal only if a synchronization timer has not expired.

9. The method according to claim 8, the method further comprising:
   re-transmitting from the communication device the synchronization signal on the common channel after an integer multiple of symbol time has elapsed following reception of the synchronization signal.

10. The method according to claim 1, wherein the feedback radio resource and the data radio resource lie within spectrum of a public safety radio network which is the ad hoc wireless radio network.

11. The method according to claim 10, wherein the ad hoc wireless radio network comprises the public safety radio network operating in an ad hoc mode.

12. An apparatus for operating in an ad hoc wireless network, the apparatus comprising:
   circuitry configured to
      map a feedback radio resource from a data radio resource to at least one frequency sub-band which the data radio resource excludes and spaced in time from the data radio resource by a predetermined interval; and
      send or receive feedback for information received or sent on the data radio resource on the mapped feedback radio resource.

13. The apparatus according to claim 1, in which the at least one frequency sub-band comprises frequency edges of a radio channel bearing the data radio resource.

14. The apparatus according to claim 1, in which the at least one frequency sub-band comprises frequency edges of a component carrier bandwidth in which lies a radio channel bearing the data radio resource.

15. The apparatus according to claim 1, in which the feedback comprises an acknowledgement or a negative acknowledgement; and both the data radio resource and the feedback radio resource lie in one of license exempt or public safety radio spectrum.

16. The apparatus according to claim 1, in which the predetermined interval is a function of a size of the information within the data radio resource.

17. The apparatus according to claim 1, in which the circuitry is configured to
   receive the feedback after sending the information on the data radio resource, and
   delay sending the information on the data radio resource until a predetermined time offset following an end time of a previous transmission on a radio channel bearing the data radio resource, in which the predetermined time offset comprises an integer multiple of a symbol time.

18. The apparatus according to claim 1, in which the circuitry is configured to
   receive the feedback after sending the information on the data radio resource, and
   delay sending the information on the data radio resource until a predetermined time lapse for the case the apparatus is not aware of an end time for a previous transmission on a radio channel bearing the data radio resource, in which the predetermined time lapse comprises the predetermined interval plus a fixed length of the feedback radio resource.

19. The apparatus according to claim 1, in which the circuitry is configured to receive a synchronization signal on a common channel and synchronize the data radio resource to timing defined by the synchronization signal only if a synchronization timer has not expired.

20. The apparatus according to claim 19, in which the circuitry is configured to re-transmit the synchronization signal on the common channel after an integer multiple of symbol time has elapsed following reception of the synchronization signal.

21. The apparatus according to claim 1, wherein the feedback radio resource and the data radio resource lie within spectrum of a public safety radio network which is the ad hoc wireless radio network.

22. The apparatus according to claim 21, wherein the ad hoc wireless radio network comprises the public safety radio network operating in an ad hoc mode.

23. A non-transitory computer readable memory tangibly storing a computer program executable by at least one processor, the computer program comprising:
- code for mapping a feedback radio resource from a data radio resource to at least one frequency sub-band which the data radio resource excludes and spaced in time from the data radio resource by a predetermined interval; and
- code for sending or receiving feedback for information received or sent on the data radio resource on the mapped feedback radio resource.

* * * * *